United States Patent [19]

Pellegrini et al.

[11] Patent Number: 5,710,080

[45] Date of Patent: Jan. 20, 1998

[54] THERMALLY INSULATING MATERIAL, SPECIFICALLY DESIGNED FOR GARMENTS, QUILTS, SLEEPING BAGS AND THE LIKE

[75] Inventors: Antonio Pellegrini; Marciano Siniscalchi, both of Robbiate, Italy

[73] Assignee: Thermore (Far East) Ltd., Kowloon, Hong Kong

[21] Appl. No.: 530,084

[22] Filed: Sep. 19, 1995

[30] Foreign Application Priority Data

Sep. 23, 1994 [IT] Italy .................... MI94A1943

[51] Int. Cl.⁶ .................................................. B32B 7/00
[52] U.S. Cl. ..................... 442/304; 442/373; 442/382; 442/401
[58] Field of Search ........................... 428/284, 246, 428/252, 253, 287, 298, 198, 296; 442/304, 373, 382, 401

[56] References Cited

U.S. PATENT DOCUMENTS

| | | | |
|---|---|---|---|
| 5,236,770 | 8/1993 | Assent et al. | 428/296 |
| 5,437,909 | 8/1995 | Herzberg | 428/296 |
| 5,443,893 | 8/1995 | Herzberg | 428/296 |
| 5,484,645 | 1/1996 | Lichfield | 428/296 |
| 5,527,600 | 6/1996 | Frankosky et al. | 428/286 |

*Primary Examiner*—James J. Bell
*Attorney, Agent, or Firm*—Bucknam and Archer

[57] ABSTRACT

The present invention relates to a thermally insulating material, specifically designed for garments or cloth articles, quilts, sleeping-bags and the like, the main feature of which is that said material comprises a synthetic fibre lap, bound by low-melting synthetic fibres and/or aqueous emulsion resins, which are spray applied. To the lap at least a textile supporting layer, processed by a resin, is coupled. The textile supporting layer has an air permeability less than that of the lap.

25 Claims, 2 Drawing Sheets

THERMALLY INSULATING MATERIAL, SPECIFICALLY DESIGNED FOR GARMENTS, QUILTS, SLEEPING BAGS AND THE LIKE

BACKGROUND OF THE INVENTION

The present invention relates to a thermally insulating material, which has been specifically designed for garments or cloth articles, quilts, sleeping bags and the like.

As is known, for making cloth articles, sleeping bags, quilts and the like are conventionally used thermally insulating materials, said articles being practically made of a wadding material usually comprising a great volume layer of fibres of different nature, different deniers, preferably from 0.1 to 10 deniers, mainly polyester fibres in their standard variations, the material being further siliconized (in order to provide it with slippery and good feel properties, as well as low melting properties), in order to thermally bound the wadding.

This layer is sprayed by aqueous emulsion resins, usually acrylic resins, which, upon cross-linking, provide a permanent binding between the fibres, and, in particular, on the surface of the article.

If low-melting resin or fibre is used, then on the wadding surface is coated a layer of a fabric material or of a not-woven fabric material.

This layer will merely operate as a barrier layer in order to prevent not strictly bound fibres from exiting the mass of the products, and being anchored to the wadding material by several methods.

The above mentioned type of product is usually affected by several drawbacks, the main of which is that it is scarcely efficient in preventing fibres from migrating; moreover such an article has an insufficiently soft hand and it has an insufficient stability under the washing stresses.

Attempts have been also performed in order to coat a thin resin layer on the surface of the wadding by using direct spreading, foaming or transfer methods, and this in order to improve the properties of the finished articles, in the presence of wind, to cause said material to properly resist against water, i.e. for providing it with "water proof" properties, or in order to allow the use of not resin-bound fabrics, while preventing the fabric fibres from migrating or exiting the fabric material.

The obtained results have been found to be unsatisfactory, mainly because of the high thickness of the coated layer which is susceptible to increase the stiffness of the wadding and reducing the draping properties or capabilities thereof.

SUMMARY OF THE INVENTION

Accordingly, the aim of the present invention is to overcome the above mentioned drawbacks, by providing a thermally insulating material, specifically designed for garments or cloth articles, quilts, sleeping bags and the like, in which it is possible to stably bound to one another the several fibres thereof while providing optimum anti-wind characteristics, and preferring a good softness and hand of the made product.

Within the scope of the above mentioned aim, a main object of the present invention is to provide a thermally insulating layer or material, having very good softness and draping properties, together with very good anti-winding features.

Another object of the present invention is to provide such a thermally insulating material layer or article, which does not require any specifically designed processing method, such as needling operations, and which can be processed easily and quickly.

Yet another object of the present invention is to provide such a thermally insulating material which can be easily made starting from easily commercially available materials and which, moreover, is very competitive from a mere economic standpoint.

According to one aspect of the present invention, the above mentioned aim and objects, as well as yet other objects, which will become more apparent hereinafter, are achieved by a thermally insulating material, specifically designed for garments, quilts, sleeping-bags and the like, characterized in that said material comprises a lap of synthetic fibres, bound by low-melting synthetic fibres and/or spray-applied aqueous emulsion resins, with said lap being associated at least a resin processed textile supporting layer, said textile supporting layer having an air permeability less than that of said lap.

BRIEF DESCRIPTION OF THE DRAWINGS

Further characteristics and advantages of the present invention will become more apparent hereinafter from the following detailed disclosure of a preferred, though not exclusive, embodiment of a thermally insulating material, specifically designed for garments, quilts, sleeping-bags and the like, which is illustrated, by way of an indicative, but not limitative example, in the accompanying drawings, where.

DESCRIPTION OF THE PREFERRED EMBODIMENTS

Figure 1:
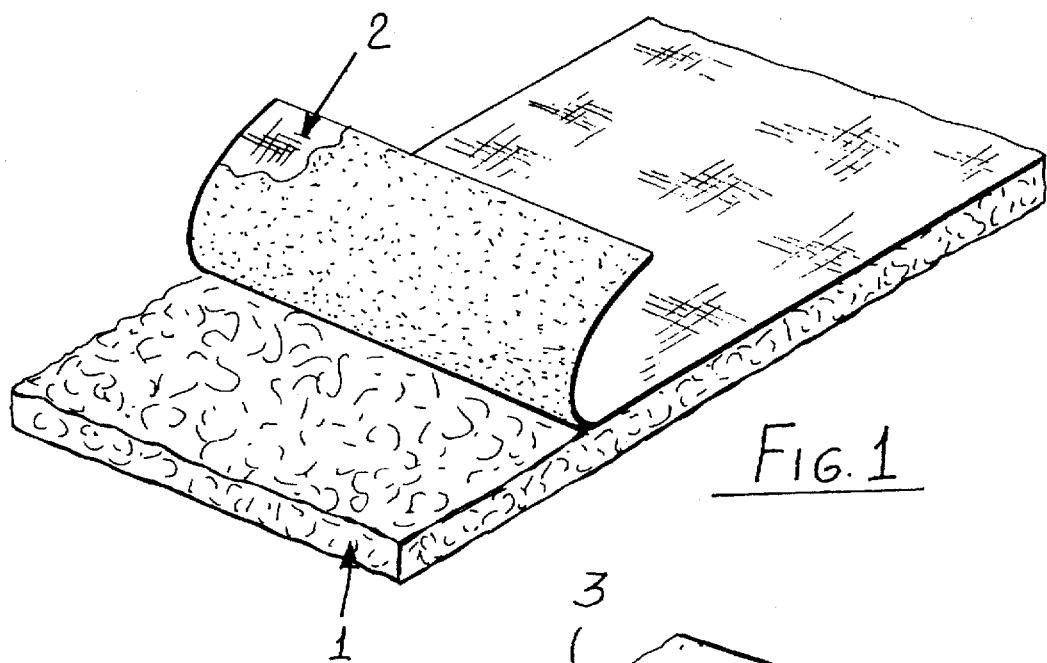
FIG. 1 schematically illustrates a lap to a face of which is applied a fabric layer.
Figure 2:
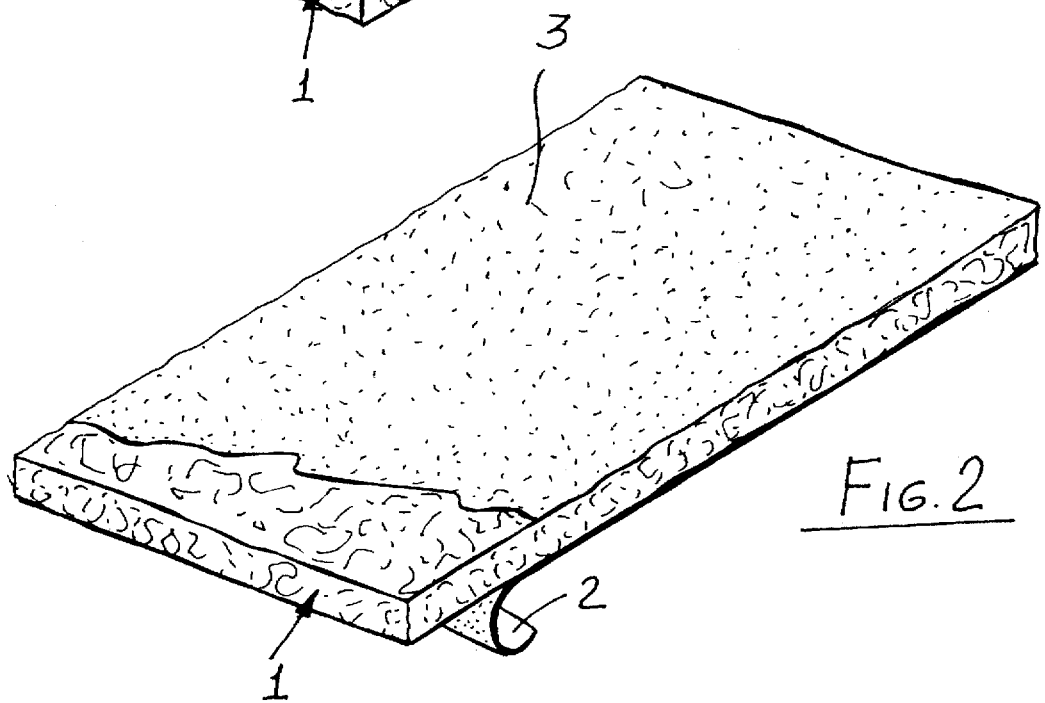
FIG. 2 illustrates a lap to a face of which is applied a sprayed resin layer, and to the other face of which is applied a fabric layer.
Figure 4:
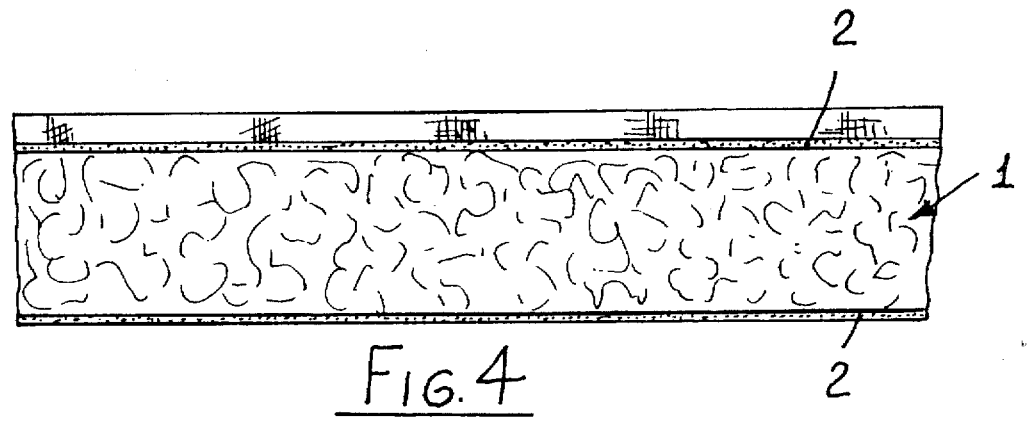
FIG. 4 illustrates the subject thermally insulating material applied to a single layer or sheet of a garment fabric.
Figure 3:
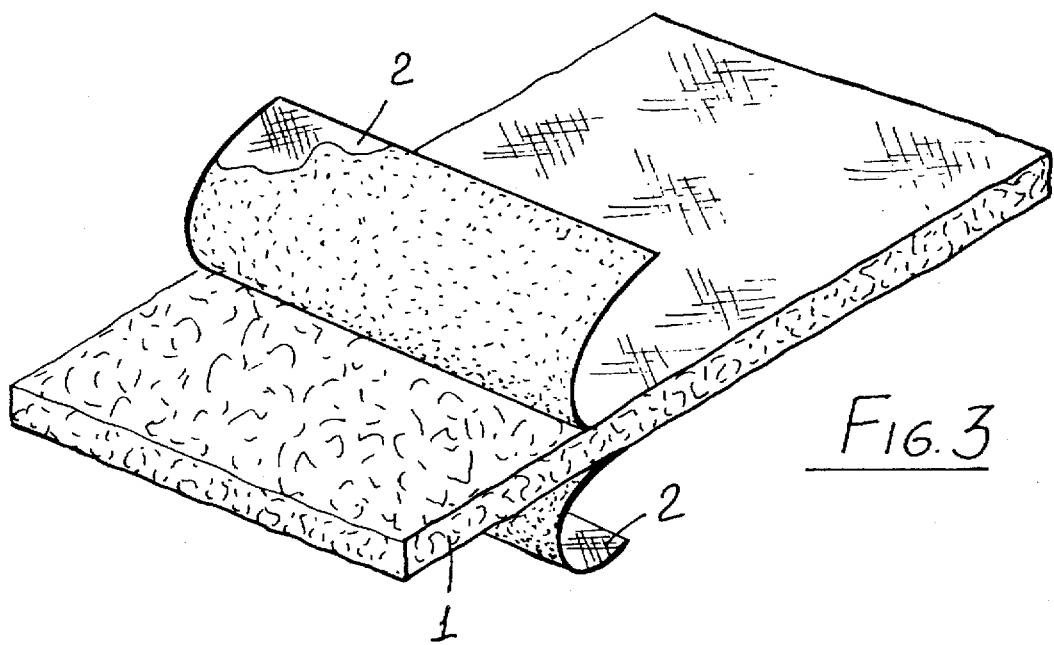
FIG. 3 illustrates a lap to the two faces of which are applied fabric layers.
Figure 5:
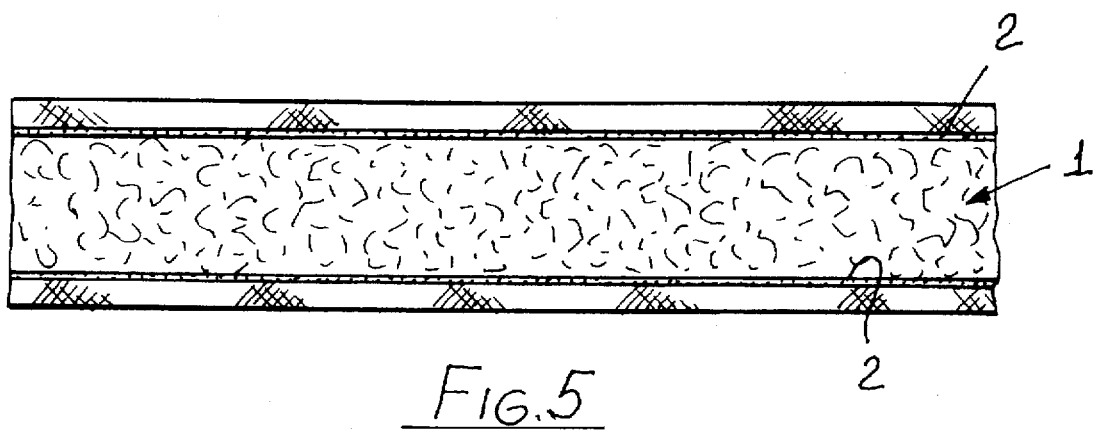
FIG. 5 illustrates the material according to the present invention sandwiched between two fabric outer layers, of any desired types.

With reference to the above mentioned figures, the thermally insulating material, specifically designed for making garments, quilts, sleeping bags and the like, according to the present invention, comprises a lap 1, which is made from a polyester and/or polypropylene staple material, having a count preferably from 1.7 to 6.6 dtex and a length from 38 to 120 mm.

The polyester and/or polypropylene staple material is used in a rate from 50% to 95% by weight, and it can be either fully or partially siliconized.

The polyester and/or polypropylene staple material is mixed with a binding element, included in a rate from 5 to 50%, and comprising low-melting fibres, i.e. fibres having a surface softening temperature less than that of a standard polyester or polypropylene staple material.

The binding element or agent can also comprise a resin applied by spraying an aqueous emulsion thereof, or a combination of low-melting fibres and resins.

The polyester staple material, which is easily available on the market and is comparatively inexpensive, mainly with the counts above mentioned, constitutes the supporting or bearing structure of the insulating material, and provides the latter with the required resiliency characteristics, i.e. the required crushing, softness and draping features.

The use of siliconized fibres, processed by polysiloxanes, and then cross-linked, will provide the end product with good hand characteristics, similar to those of the goose feathers and being, in some applications, very agreeable for the consumer.

Alternatively to the use of siliconized fibres, it is possible to impregnate the lap by an aqueous emulsion of thermocrosslinking silicone, so as to provide all of the fibres with a suitable slippery capability; the impregnated lap, as it should be apparent, must be subjected to a suitable drying and thermo-crosslinking processing.

It should be pointed out that, in general, the use of a greater count will provide the obtained material with a greater resiliency.

This property is particularly useful for making sleeping bags and quilts, whereas the use of smaller-count fibres will improve the softness of the material and, in particular, as the finished product has a high density, it will increase the thermally insulating properties thereof.

By suitably mixing fibres of different counts and types, it is possible to make a broad range of products, having different aesthetic or mechanical characteristics, which, however, are all provided with those properties deriving to the provision of the not-woven and spun-bonded layer or layers, impregnated by the compounds which will be disclosed in a more detailed manner hereinafter.

The binding element or agent of the lap substantially comprises the above mentioned low-melting fibres which, as a suitable temperature is achieved, will cause the outer surface of the material to melt in a localized manner and will provide, at the contact points with the other fibres, a permanent binding providing the lap with good stability properties.

In order to facilitate the making of the lap by conventional textile apparatus, the length and/or diameter of the low-melting fibres should be near to those of the other fibres.

In order to provide a satisfactory size stability, the rate by weight of the low-melting fibres should be included between 5% and 30%.

In this connection, it should be pointed out that an increase of the low-melting fibre rate will improve the mechanical characteristics of the material, but it will also increase the stiffness of the lap.

On the market are available two types of low-melting polyester fibres, that is homogeneous structure fibres, comprising a low-melting polyester copolymer, and two-component fibres, having a core comprising polyethylene therephthalate and an outer layer or cladding made of copolymer.

Both these types can be used even if they will involve difference in the thermobinding times and temperatures.

To the low-melting fibres it is also possible to add the effects of a spray resin operation, or it is possible to bind the lap by exclusively using sprayed resins.

In such a case, are preferably used aqueous emulsions of cross-linking acrylic resins, owing to their easily processing properties, as well as their washing resistance properties and their low cost.

Variations of the present invention can also provide for using different types of resins, such as butadiene, styrene or polyurethane resins, or mixtures thereof.

The emulsions provided for spraying the lap are typically characterized by a vitrification temperature (Tg) from $-50°$ C. to $+50°$ C., a film forming temperature from $0°$ C. to $45°$ C., a viscosity from 10 to 100 cps and a dry material contents in the aqueous emulsion from 10% to 60%.

The resin will be suitably formulated in order to obtain the required processing level and the desired end characteristics.

The lap sprayed by the resin will be dried and cross-linked in an oven or by means of other heating systems.

The drying and cross-linking temperature and time will depend on the nature and amount of resins, the concentration of the aqueous emulsion and possible presence of cross-linking catalyzers, and, moreover, on the characteristics of the heating system.

While the binding effect of the resin mainly occurs on the outer surface of the lap, the low-melting fibres will provide binding sites mainly inside said lap.

Thus, in order to provide optimum softness, mechanical strength and mechanical anchoring properties for the outer fibres, it is preferably to limit the rate of the low melting fibres in a range of 12%–18%, and bind the surface fibres by spraying.

On the lap 1, made as above disclosed, are applied one or more impermeable or low air permeability layers 2, which will contribute to greatly hinder the convective air movements of the air held inside the cloth article, which convective movements would cause very great losses of heat.

The application of one or more layers, either fully or partially impermeable, on the surface of the lap or inside said lap, represents a main feature of the present invention, since it will provide the product with very good anti-wind and impermeable characteristics.

On the other hand, whereas the lap does not greatly hinder the wind effect, the above mentioned layers, on the contrary, will provide a very good barrier, so as to further increase the thermal protection provided by the above disclosed thermally insulating material, under all of the practical use conditions.

The supporting layer 2 is conventionally constituted by textile supports, processed by resins on a single face thereof, on the both faces thereof and/or inside the above disclosed lap.

The provision of layers, either fully or partially impermeable to air, on one face or on the two faces of the lap, will provide the disclosed material according to the invention with a greater thermoinsulating capability and, moreover, it will increase the anti-wind capability thereof.

The application of a layer inside the lap will hinder convective movements of the air held inside the lap, while providing a good anti-wind effect and, moreover, without altering the hand characteristics of the lap.

The position of the layers will depend on the end application of the insulating material layer.

As stated, while the above disclosed protective functions are improved, the softness and draping features of the cloth articles are not negatively affected.

The material, moreover, must have good strength properties, as well as good tearing and anti-perforating properties, it must allow the garments to be easily made, its friction coefficient must be comparatively low, and, moreover, it must resist against washings by water or solvents.

The parameters which affect a good performance of the layer will depend on the nature of the used resins, as well as on the possible additions of aids and the like as well as on the applied amount.

With respect to the nature of the resins, it should be pointed out that acrylic resins tend to easily form films, but these films have a poor mechanical strength and have undesirable sticking properties.

Thus, in order to reduce these sticking properties, it is necessary to provide the films with a comparatively great thickness and add aids or processing agents to said films.

On the other hand, the above mentioned acrylic resins are easily available on the market in several different types.

The polyurethane resins, which are more expensive, have better mechanical characteristics and, upon cross-linking, lose any sticking features.

An intermediate material is constituted by the styrene-butadiene resins.

By using mixtures pertaining to the above disclosed classes, it is possible to find the best compromise between performance and costs, for the desired applications.

The application of the resin to a textile support, such as a not woven fabric material, as thermally bound or spun-bonded, greatly increases the mechanical strength of the fully or partially impermeable layer or layers.

More specifically, the insulating material will posses a great resistance against tearing.

Thus, it will be possible to reduce the amount of the applied resins, as well as to use less noble resins which, accordingly, are less expensive, without negatively affecting the mechanical characteristics of the product.

Like considerations could be made for the sticking properties and the friction coefficient of the surface layers.

The not-sticking textile support, which has a low friction coefficient, will mainly reduce or eliminate the negative effects deriving from the sticking nature of the less noble resins.

Thermo-bound and spun-bonded not woven fabric material made of polyester fibres and/or polypropylene fibres are easily available on the market.

The thermally bound not woven materials are more available than the spun-bonded fabric materials and, generally, have a less cost.

The latter, on the other hand, have a greater mechanical strength and size stability.

This aspect affords the possibility of using lighter textile supports, the mechanical features or characteristics of the finished product being the same.

The thermally bound not woven fabric materials and the polypropylene fibre spun-bonded materials are, generally, softer than and have improved draping features with respect to the polyester materials, the latter, however, having better dry washing resistance characteristics, In order to make the hereindisclosed insulating material, it is preferred to use not-woven fabric materials or spun-bonded fabrics, having a weight varying from 5 to 50 grams/m².

The use of a textile support for the impregnation or application of the resin, represents a main feature of the present invention, whereas the nature of such a support does not constitute a characterizing feature.

With respect to the characteristic parameters of the film-forming resins, it should be pointed out that the required viscosity will be essentially a function of the apparatus used for forming the layer.

The vitrification temperature has the greatest effect on the characteristics of the product: in particular, among the acrylic resins, those having a high vitrification temperature will provide more rigid films, but with reduced sticking properties.

The nature and features or characteristics of the layer or layers must be specifically designed for each application, as well as the mixture of the fibres forming the lap.

Thereinbelow will be disclosed several examples in which the materials have been prepared in a processing system comprising:

a carding apparatus with a lap forming device;
a spraying device;
an unwinding device for unwinding the not woven material or spun-bonded material roll;
a device for applying the resin to the textile support;
drying and cross-linking oven, of the air ventilation type;
an apparatus for cutting and winding up the finished product.

EXAMPLE 1

A lap having the following composition has been prepared:

50% by weight of polyester staple having a count of 3.3 dtex and a length of 60 mm.

40% by weight of a siliconized polyester staple having a count of 3.3 dtex and a length of 60 mm.

10% by weight of a two component polyester staple of a low-melting type having a count of 4.4 dtex and a length of 51 mm (for example: Kanebo "Bellcombi" type 3380).

The made lap had a weight of 70 g per m² and a thickness of about 15 mm.

On the top layer of the wadding an aqueous emulsion acrylic resin, indicated by the reference number 3 in the accompanying drawings, has been sprayed in an amount corresponding to a dry residue, upon drying, of 10 g/m².

The bottom surface of the wadding has been deposited on a spun-bonded polypropylene layer, having a weight of 14 g/m², on which was preliminarily applied a layer of an aqueous emulsion of a styrene-butadiene resin (for example BASF Butofan 440D), in an amount corresponding to a dry residue, after drying, of 25 g/m².

The emulsion has been prepared according to the following formulation:
100 parts by weight (p.p.) Water
5 p.p. White pigment (at 50%)
50 p.p. Aqueous emulsion of styrene-butadiene
4 p.p. Melamine Formaldehyde
10 p.p. Deaerating agent The wadding has been entrained through an air oven at a temperature of 140° C. for 2 minutes.

After drying, the material had a total weight of 120 g/m².

Thereinbelow are illustrated the main features of a made sample, with respect to a reference wadding of 125 g/m², of which 95 g/m² were constituted by polyester fibres having the above disclosed composition, on the two outer surfaces thereof a resin was sprayed, in particular the above mentioned acrylic resin, for a total dry weight of the resin of 30 g/m².

| Characteristic | Example 1 | Reference |
| --- | --- | --- |
| Tensile strength [N/5 cm] | 20.3 | 5.7 |
| Specific thermal resistance UNI 7745 [mq °K./W] | 0.32 | 0.31 |
| Thermal insulation in moving air [mq °K./W] | 0.31 | 0.22 |

The values related to the heat losses in moving air were obtained by using the measurement cell UNI 7745, modified by replacing the cooling elements thereof by an air stream, perpendicular to the sample of the material being measured, at a rate of 6 m/s and at a temperature of −10° C.

EXAMPLE 2

A lap having a weight of 30 g/m² has been made, said lap having the following composition:

30% by weight of a polyester staple material having a count of 3.3 dtex and a length of 60 mm:

30% by weight of a polyester staple material having a count of 1.7 dtex and a length of 40 mm;

25% by weight of a siliconized polyester staple material having a count of 3.3 dtex and a length of 60 mm;

15% by weight of a low-melting two-component polyester staple material having a count of 2.2 dtex and a length of 60 mm (for example Kanebo type 6080).

The top layer has been sprayed by an aqueous emulsion of acrylic resins, in an amount corresponding to a dry residue, after drying, of 10 g/m².

The thus made lap has been applied on a spun-bonded polypropylene layer, having a weight of 12 g/m², on which an aqueous emulsion of a polyurethane resin was preliminarily applied, having the formulation hereinbelow illustrated and a dry weight of 20 g/m².

| 100 parts by weight | aqueous emulsion of an aliphatic polyurethane resin (Morton Vithane 3950, 35% dryness) |
|---|---|
| 0.1 p.p. | antifoam agent |
| 4 p.p | silica (Degussa OK 412) |
| 2 p.p. | siliconic emulsion (50% dryness) |
| 10 p.p. | thickening agent (35% dryness) |
| 4 p.p. | cross-linking catalyzer (aliphatic isocianate) |
| 15 p.p. | (suspension of titanium bioxide in water at 25%) |

This material has been caused to pass through an oven for 3 minutes, at a temperature of 140° C., and it had a total weight of 72 g/m².

The features or characteristics of the sample are compared with those of a reference wadding of 80 g/m², of which 60 g/m² are constituted by a polyester fibre, in particular of the above disclosed mixture, on the two surfaces thereof was sprayed a resin Rohm & Haas Rhoplex E-32, for a total weight of dry resin of 20 g/m².

| Characteristic | Example 2 | Reference |
|---|---|---|
| Tensile strength [N/5 cm] | 18.1 | 4.5 |
| Specific thermal resistance UNI 7745 [mq °K./W] | 0.26 | 0.26 |
| Thermal insulation in moving air [mq °K./W] | 0.25 | 0.18 |

EXAMPLE 3

A lap was prepared having the following composition:

50% by weight of a polyester staple material having a count of 6.6 dtex and a length of 60 mm:

40% by weight of a siliconized polyester staple material having a count of 6.6 dtex and a length of 60 mm;

10% by weight of a low-melting monopolymeric polyester staple material having a count of 6.6 dtex and a length of 51 mm (for example Kanebo type 4000).

The made lap had a weight of 200 g/m² and a thickness of about 30 mm.

On the top surface of the wadding has been sprayed an acrylic resin in aqueous emulsion (the same as that of the preceding examples), in an amount of dry residue after drying of 25 g/m².

The bottom surface of the wadding has been deposited on a spun-bonded polypropylene layer having a weight of 14 g/m², on which has been preliminarily applied a layer of a thickened acrylic resin type Texacomp RTO, supplied by the Company TWS of Villasanta (Milan), in an amount corresponding to a dry residue, after drying, of 30 g/m².

The characteristics of the thus made sample are the following:

| Characteristic | Example 3 |
|---|---|
| Tensile strength [N/5 cm] | 21.8 |
| Specific thermal resistance UNI 7745 [mq °K./W] | 0.41 |
| Thermal insulation in moving air [mq °K./W] | 0.38 |

EXAMPLE 4

On a compound made according to Example 2 and, more specifically, on the side thereof supporting the spun-bonded propylene material, has been applied a further lap layer having a like composition, and a weight of 40 g/m²; the free surface of the lap has been moreover sprayed by a suitable acrylic resin in an amount of 10 g/m² (dry).

The spun-bonded material was preliminarily processed by a spray of 15 g/m² of that same resin.

The end composition of the sample was the following:

a layer of 40 g/m² of fibres, sprayed with 10 g/m² of acrylic resin;

spun-bonded material of 12 g/m² with a polyurethane resin layer of 20 g/m², on the top of which was sprayed 15 g/m² of acrylic resin;

layer of 30 g/m² of fibre, sprayed with 10 g/m² of acrylic resin.

Total weight 137 g/m².

| Characteristic | Example 4 |
|---|---|
| Tensile strength [N/5 cm] | 18.5 |
| Specific thermal resistance UNI 7745 [mq °K./W] | 0.38 |
| Thermal insulation in moving air [mq °K./W] | 0.37 |

EXAMPLE 5

A lap was made having a weight of 60 g/m² and the following composition:

60& by weight of a polypropylene fibre having a count of 2.2 dtex and a length of 50 mm;

40% by weight of a polypropylene fibre having a count of 6.6 dtex and a length or cut of 60 mm.

The top surface has been sprayed by 50 g/m² of an aqueous emulsion acrylic resin, corresponding to a 15 g/m² of dry resin.

The wadding has been deposited on a polyester not woven fabric, having a weight of 12 g/m², on which has been preliminarily applied a layer of 25 g/m² of thickened and compounded acrylic resin.

The wadding has been caused to pass through an air oven at a temperature of 110° C., for 4 minutes, and it had a total weight of 100 g/m² with the following characteristics.

| Characteristic | Example 5 |
| --- | --- |
| Tensile strength [N/5 cm] | 19.6 |
| Specific thermal resistance UNI 7745 [mq °K./W] | 0.31 |
| Thermal insulation in moving air [mq °K./W] | 0.29 |

From the above illustrated Example it should be apparent that the invention, which comprises applying an already resin processed lap to at least a layer of a not woven or spun-bonded fabric material, having an air permeability less than that of the lap, jointly to the spraying of the other surface of the lap, will allow to obtain a product having a very reduced weight, a very good softness and very good draping characteristics, which are particularly suitable for making garments and the like.

The thermal power of the obtained product is greatly increased with respect to conventional prior products, and, moreover, the inventive product is not negatively affected by the outwardly migration of the fibres thereof.

The tensile strength of this new thermally insulating material is much greater than that of the reference samples (conventional waddings). This will provide the end article with a greater duration and stability.

With respect to conventional products, moreover, the tensile strength is less dependant on the total weight of the material. This is due to the fact that is the textile support (processed by resins) which provides the mentioned tensile strength and stability to the new thermally insulating material.

The specific thermal resistance, according to the UNI 7745 standard, is greater, the weight being the same, than that of the reference samples; moreover, the presence of moving air does not negatively affect the thermal resistance of the new material, whereas conventional materials are greatly degraded in their thermoinsulating properties.

The invention, as disclosed, is susceptible to several modifications and variations, all of which will come within the inventive idea scope.

Moreover, all of the details can be replaced by other technically equivalent elements.

In practicing the invention, the used materials, as well as the contingent size and shapes can be any, depending on requirements.

We claim:

1. A thermally insulating material for garments, quilts, sleeping-bags and the like, comprising a lap of staple synthetic fibres, bound by low-melting synthetic fibres and/or spray-applied aqueous emulsion resins, wherein said low-melting synthetic fibers have a melting point less than that of said synthetic fibres, wherein said staple synthetic fibres have a count from 1.7 to 6.6 dtex and a length from 38 to 120 mm, wherein said lap comprises from 50 to 95% by weight of synthetic fibres and from 5 to 50% by weight of low-melting fibres and/or resins, and wherein to said lap is bonded at least a not sticking low friction coefficient textile support layer, said textile support layer having at least a surface thereof on which is applied an aqueous dispersion of a synthetic resin in an amount from 50 to 80 g/m² of a surface of said textile support layer, said textile support layer having an air permeability less than that of said lap.

2. A thermally insulating material, according to claim 1, wherein said lap comprises polyester fibres bound by low-melting fibres.

3. A thermally insulating material, according to claim 1, wherein said lap comprises polypropylene fibres bound by low-melting fibres.

4. A thermally insulating material, according to claim 1, wherein said lap comprises a mixture of polyester and polypropylene fibres, bound by low-melting fibres.

5. A thermally insulating material, according to claim 1, wherein said lap comprises polyester fibres, bound by spray applied aqueous emulsion resins.

6. A thermally insulating material, according to claim 1, wherein said lap comprises polypropylene fibres, bound by spray applied aqueous emulsion resins.

7. A thermally insulating material, according to claim 1, wherein said lap comprises a mixture of polyester and polypropylene fibres, bound by spray applied aqueous emulsion resins.

8. A thermally insulating material, according to claim 1, wherein said lap comprises polyester fibres, bound by low melting fibres and spray applied aqueous emulsion resins.

9. A thermally insulating material, according to claim 1, wherein said lap comprises polypropylene fibres, bound by low-melting fibres and spray applied aqueous emulsion resins.

10. A thermally insulating material, according to claim 1, wherein the textile support layer comprises a thermobound non woven fabric material, of polypropylene or polyester fibres.

11. A thermally insulating material, according to claim 1, wherein said textile support layer comprises a polypropylene or polyester fibres spun-bonded material.

12. A thermally insulating material, according to claim 1, wherein said textile support layer comprises a knitted fabric material.

13. A thermally insulating material, according to claim 1, wherein said textile support layer comprises a thermobound non woven textile material or a spun-bonded material, of polypropylene or polyester fibres, having a weight from 5 to 50 g/m².

14. A thermally insulating material, according to claim 1, wherein said textile support layer comprises a knitted fabric material having a weight from 20 to 250 g/m².

15. A thermally insulating material, according to claim 1, wherein said textile support layer has applied to at least a surface thereof an aqueous dispersion of acrylic resins.

16. A thermally insulating material, according to claim 1, wherein said textile support layer has applied to at least a surface thereof an aqueous dispersion of styrene-butadiene resins.

17. A thermally insulating material, according to claim 1, wherein said textile support layer has applied to at least a surface thereof an aqueous dispersion of polyurethane resins.

18. A thermally insulating material, according to claim 1, wherein said textile support layer has applied to at least a said surface thereof a mixture of an aqueous dispersion of acrylic resin, styrene-butadiene and/or polyurethane resins.

19. A thermally insulating material, according to claim 1, wherein said resin is applied to at least a said surface of said textile support by means of a full bath impregnation.

20. A thermally insulating material, according to claim 1, wherein said resin is applied to at least a said surface of said textile support, by a doctor spreading operation.

21. A thermally insulating material, according to claim 1, wherein said resin is applied to said at least a surface of said textile support by means of rotary cylinders, rotating in the same direction or in opposite direction.

22. A thermally insulating material, according to claim 1, wherein said at least a textile support layer is arranged on a surface of said lap.

23. A thermally insulating material according to claim 1, wherein said at least a layer of textile support is provided inside said lap.

24. A thermally insulating material, according to claim 1, wherein said material further comprises said textile support layer on two faces of said lap.

25. A thermally insulating material, according to claim 1, wherein said material further comprises at least a said textile support layer arranged on a face and at least a said textile support layer arranged inside said lap.

* * * * *